United States Patent [19]

Mancini et al.

[11] Patent Number: 5,358,357
[45] Date of Patent: Oct. 25, 1994

[54] PROCESS AND APPARATUS FOR HIGH VACUUM GROUNDWATER EXTRACTION

[75] Inventors: Alfonso R. Mancini, Penfield; Ronald E. Hess, Webster; Richard A. Williams, Sodus Point; Douglas J. Montgomery, Ontario; Heinrich J. Jurzysta, Rochester, all of N.Y.

[73] Assignee: Xerox Corporation, Stamford, Conn.
[21] Appl. No.: 56,349
[22] Filed: Apr. 30, 1993
[51] Int. Cl.$^5$ .......................... E03B 3/12; E21B 43/00
[52] U.S. Cl. .................................. 405/128; 166/268; 166/372
[58] Field of Search .................... 166/268, 275, 372; 405/128, 129

[56] References Cited

U.S. PATENT DOCUMENTS

| | | | |
|---|---|---|---|
| 753,045 | 2/1904 | Cooper | 166/372 X |
| 1,291,130 | 1/1914 | Purchas | |
| 1,547,194 | 7/1925 | Arbon | 166/372 X |
| 2,026,419 | 12/1935 | Davidson | 166/372 X |
| 3,743,355 | 7/1973 | Blackwell et al. | 299/12 |
| 4,017,120 | 4/1977 | Carlson et al. | 166/372 X |
| 4,180,980 | 1/1980 | Marks et al. | |
| 4,267,885 | 5/1981 | Sanderford | 166/372 X |
| 4,323,122 | 4/1982 | Knopik | 166/267 |
| 4,392,532 | 6/1983 | Raggio | 166/372 |
| 4,444,260 | 4/1984 | Boyd et al. | 166/267 |
| 4,497,370 | 2/1985 | Breslin | 166/372 |
| 4,593,760 | 6/1986 | Visser et al. | 166/267 |
| 4,625,801 | 12/1986 | McLaughlin et al. | 166/372 X |
| 4,660,639 | 4/1987 | Visser et al. | 166/267 |
| 4,730,672 | 3/1988 | Payne | 166/266 |
| 4,886,119 | 12/1989 | Bernhardt et al. | 166/267 |
| 4,890,673 | 1/1990 | Payne | 166/266 |
| 4,892,664 | 1/1990 | Miller | 210/747 |
| 4,895,085 | 1/1990 | Chips | 110/346 |
| 4,945,988 | 8/1990 | Payne et al. | 166/266 |
| 4,982,788 | 1/1991 | Donnelly | 166/266 |
| 5,009,266 | 4/1991 | Dieter | 166/245 |
| 5,018,576 | 5/1991 | Udell et al. | 166/272 |
| 5,031,697 | 7/1991 | Wellington et al. | 166/372 X |
| 5,050,676 | 9/1991 | Hess et al. | 166/267 |
| 5,076,360 | 12/1991 | Morrow | 166/267 |
| 5,172,764 | 12/1992 | Hajali et al. | 166/267 |
| 5,197,541 | 3/1993 | Hess et al. | 166/67 |

OTHER PUBLICATIONS

Proceedings of the NWWA/API Conference on Petroleum Hydrocarbons and Organic Chemicals in Ground Water, Nov. 1986.

EPA Site Demonstration of the "Terra Vac" in situ Vacuum Extraction Process, Mary Stinson, 1989.

Forced Venting to Remove Gasoline Vapor from a Large-Scale Model Agnifer, API Publication 4431 (1984).

Venting for the Removal of Hydrocarbon Vapors from Gasoline Contaminated Soil, J. Environ. Sci. Health, A17(1), pp. 31–44 (1982).

*Primary Examiner*—Randolph A. Reese
*Assistant Examiner*—John A. Ricci
*Attorney, Agent, or Firm*—Judith L. Byorick

[57] ABSTRACT

Disclosed is a process and apparatus in which vacuum extraction is used to remove soil contaminants in both the saturated and vadose zones. One embodiment of the present invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams. Also disclosed is an apparatus for carrying out the process.

18 Claims, 8 Drawing Sheets

PROCESS AND APPARATUS FOR HIGH VACUUM GROUNDWATER EXTRACTION

BACKGROUND OF THE INVENTION

This invention is directed to a process and apparatus for removing chemical contaminants from groundwater. More particularly, the present invention is directed to a process and apparatus in which vacuum extraction is used to remove soil contaminants in both the saturated and vadose zones. One embodiment of the present invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which, is primarily gaseous; and separately treating the separated liquid and gas streams. Another embodiment of the present invention is directed to an apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe for introducing a gas into the vacuum extraction pipe to initiate two-phase flow within the vacuum extraction pipe, a riser pipe gas inlet for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a two-phase common stream, and a means for receiving the common stream and separating the stream into separate gas and liquid streams.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323,122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al.), the disclosure of which is totally incorporated herein by reference, and U.S. Pat. No. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction wells.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A 17(1), 31-44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 4,892,664 (Miller), the disclosure of which is totally incorporated herein by reference, discloses a method and system for decontaminating water, such as groundwater or process effluent, which is contaminated by small concentrations of dissolved volatile organic compounds. The process includes introducing a flow of the water to an air stripping stage in which the water is directed through the column to air strip organic molecules from the contaminated water, releasing the decontaminated water to the environment, pretreating the organic compounds carrying air in the substantial absence of water through a preheater, passing the heated air through a catalytic stage that oxidizes the organic compounds, and releasing the gaseous effluent from the catalytic stage to the atmosphere. Water containing small concentrations of dissolved volatile organic compounds can also be decontaminated by including an apparatus for retrofitting an existing air stripper for this purpose.

Further, U.S. Pat. No. 4,444,260 (Boyd et al.) discloses a method for the treatment of oil well production streams to process oil-contaminated sand to recover oil therefrom and produce an ecologically acceptable clean sand residue. The process entails separating the production fluid from an oil well having sand entrained therein from a plurality of components, one of which comprises an oil-contaminated sand. The contaminated sand is contacted with a light oil solvent to initiate a solvating action of the oil contaminant. The resulting mixture of oil-contaminated sand and solvent is then contacted with water and the system then gravity separated into discrete sand, water, and oil phases. The oil and water phases can be removed from the sand and the sand phase again contacted with water and the resulting mixture is then subjected to gravity separation to produce separate sand and water phases. The water phase is then removed and the sand passed to a suitable disposal facility.

Additionally, U.S. Pat. No. 4,730,672 (Payne) and U.S. Pat. No. 4,890,673 (Payne), the disclosures of each of which are totally incorporated herein by reference, disclose a method and apparatus for collecting volatile contaminants from the vadose layer of earth. The apparatus is a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

U.S. Pat. No. 4,945,988 (Payne et al.), the disclosure of which is totally incorporated herein by reference, discloses a process for removing and disposing of or neutralizing volatile contaminants existing, in the vadose zone of earth and also in a below ground aquifer. The process includes the injection of substantially oxygen free air into the aquifer to retard the formation of aerobic bacteria and injection of oxygen rich air into the vadose zone to stimulate bacterial growth which aids contaminant recovery. Volatilized contaminants are pulled out of the soil through withdrawal wells which terminate in the vadose zone.

U.S. Pat. No. 4,886,119 (Bernhardt et al.) discloses a process for driving volatile impurities from a ground by means of air by aspirating an afterflow air and impurities containing gases which penetrated through a permeable wall of a shaft in a ground, at one or several locations. In regions of expected high gas contents, air afterflow passages are extended to these regions for supplying the afterflow air, and an adjustable afterflow resistance is arranged in the passages for influencing a negative pressure value and a flow speed in these regions.

U.S. Pat. No. 3,743,355 (Blackwell et al.) discloses a method for withdrawing hazardous gases from a water saturated subterranean formation containing a mineral deposit suitable for mining. The process entails drilling wells through the subterranean formation and withdrawing water from the subterranean formation to establish permeability to gas within the subterranean formation. Gas is then withdrawn from the formation by means of the wells. The method is particularly applicable for reducing the influx of radon into a mine contained in a mineral deposit.

U.S. Pat. No. 5,050,676 (Hess et al.) and U.S. Pat. No. 5,197,541 (Hess et al.), the disclosures of each of which are totally incorporated herein by reference, disclose an apparatus and process for extracting contaminants from soil both above and below the water table. The process comprises placing a perforated riser pipe in a borehole in a selected portion of the contaminated area, wherein the perforations of the riser pipe are situated below the water table. Optionally, some of the perforations in the riser pipe can also be situated in the vadose zone above the water table. A vacuum is then applied to the pipe to draw gases and liquids from the soil into the pipe and to transport the gases and liquids to the surface as a common stream. At the surface, the common stream is separated into a primarily liquid stream and a primarily gaseous stream, and the separated streams are then treated separately.

U.S. Pat. No. 5,172,764 (Hajali et al.), the disclosure of which is totally incorporated herein by reference, discloses a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe, while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Also disclosed is an apparatus for carrying out the process.

U.S. Pat. No. 5,076,360 (Morrow), the disclosure of which is totally incorporated herein by reference, discloses a method and apparatus for vacuum extraction of contaminants from the ground which, in a preferred embodiment, involves vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well, permitting vacuum extraction of both liquids and gases from the subsurface by way of wells having a liquid layer which is more than thirty feet below the soil surface or in which a screened interval of the extraction pipe is entirely below the liquid surface.

U.S. Pat. No. 1,547,194 (Arbon) discloses a system for elevating oil consisting in packing a well between the eduction tube and casing to cause the accumulation of the gas, arranging valved ejectors in said tube above and below the packing, and regulating the valves to cause successive elevation of fluid in the tube.

U.S. Pat. No. 753,045 (Cooper) discloses a method of obtaining gas from wells containing water with gas held in solution which consists in lifting the water in the well by means of a hydrocarbon gas introduced under pressure into the water column below and collecting the gas liberated from the lifted water.

U.S. Pat. No. 1,291,130 (Purchas) discloses an eduction pipe for air lifts, the cross section of which varies in steps, the maximum cross section being at the bottom and adapted to be submerged, the minimum cross section following the maximum cross section, the section larger than the minimum but smaller than the maximum following the minimum section.

U.S. Pat. No. 2,026,419 (Davidson) discloses an apparatus and process for enlarging the normal subterranean liquid capacity of the supply area of a tube well which consists of oscillating indigenous liquid of the area by pumping forces set up in the tube to dislodge alluvium and simultaneously applying air pressure to remove the alluvium from the well.

U.S. Pat. No. 4,017,120 (Carlson et al.) discloses the production of hot brines containing dissolved gases from liquid dominated geothermal wells by utilizing lift gases of essentially the same composition as the dissolved gases. The lift gas is separated from the produced brine and recycled. Heat is abstracted from the separated brine, which may be returned to the aquifer, processed for its mineral content, or discarded. The gas lift is carried out under temperature and pressure conditions such that the precipitation of minerals from the brine does not occur in the well bore.

U.S. Pat. No. 4,180,980 (Marks et al.) discloses a method and apparatus for releasing for use air that has been absorbed under pressure in sea water or in any other large free body of water. An elongated conduit or other equivalent means is vertically disposed so that air released from its upper end is collected by an open bottom container serving is a reservoir. The interface of the collected air and the submersion level of water within the reservoir is substantially below the free water surface level. A small amount of gas is introduced at the lower end of the conduit so as to rise upwardly through the conduit, thereby carrying water behind it, and to initiate a continuous process in which the rising water is under decreasing pressure, at times increasing temperature, thereby releasing more air, which in turn carries more water behind it. Air from the reservoir can be used as an energy source.

U.S. Pat. No. 4,267,885 (Sanderford) discloses a method and apparatus to optimize and control the production of an oil well which is being artificially produced by gas-lift techniques. The invention is suitable for use with either continuous or intermittent gas-lift operation and can be used with a combination of both. The temperature of the fluid at the wellhead is sensed and used to determine the injection parameter values to optimize well production. In one embodiment, a process control unit is programmed according to the inventive method to interpret the temperature data and to control the gas control valve to optimize production.

U.S. Pat. No. 4,895,085 (Chips) discloses a method and structure whereby contaminated soil is decontaminated in situ by the extraction of vapor from the soil and subsequent destruction of the contaminants contained in the interstitial fluid of the soil by processing the fluid through an internal combustion engine or other suitable combustion means. To achieve this purpose, a means of conducting the fluid from the soil to a manifold system is provided.

U.S. Pat. No. 4,982,788 (Donnelly) discloses an apparatus and method for removing hazardous volatile contaminants from the ground by circulating air between two substantially parallel wells and by removing the vapors of the organic compound from the circulated air using at least one of a condenser and a demister. To enhance efficiency the air is recirculated in a closed loop. The heat output of the condensation process is used to heat the recirculated air. Pipes having openings along only a limited portion of their lengths are placed in the wells and the depth of the openings adjusted to treat one level at a time, thereby preventing shunting of air through more porous soil layers. Flow rates can be equalized by using circumferentially placed induction wells surrounding an extraction well (or the reverse) and by controlling air flow through individual sections of a given level.

U.S. Pat. No. 5,009,266 (Dieter) discloses a method for the in situ removal of mobilizable contaminants, including volatile and semi-volatile organic compounds, from a contaminated unsaturated zone of primarily porous layers of soil. The method comprises pulsatilely injecting heated pressurized steam into a first location in the zone to heat the soil in the zone, and withdrawing the contaminants under subatmospheric pressure from the soil at a second location in the zone. In specific application, the pulsatile injection of steam is used to heat the soil without directly recovering injected steam for a significant period of time until the targeted soil in the zone is uniformly heated to steam temperature. The pulsatile injection directs the heat in particular directions and to particular areas in the soil zone as desired.

U.S. Pat. No. 5,018,576 (Udell et al.) discloses a method for in situ decontamination of contaminated subsurface area by injection of steam into injection wells and withdrawing liquids and vapors from extraction wells under subatmospheric pressure whereby steam is passed through the contaminated area in an essentially horizontal direction. After a substantial portion of the contamination has been removed in this manner, the injection of steam is ceased, but the extraction at subatmospheric pressure is continued, to volatilize and remove the residual water and contaminants trapped in the pores of the soil. The steam injection may be periodically resumed to reheat the area and to replenish the water in the pores.

Although known apparatuses and processes are suitable for their intended purposes, a need remains for a process and apparatus for removing contaminants from groundwater and soil which enables contaminant removal from below and/or above the water table. A need also remains for a process and apparatus for removing contaminants from groundwater and soil which enables contaminant removal from soils of varying air permeability and varying porosity. Further there is a need for a process and apparatus for removing contaminants from groundwater and soil which enables increased flexibility in the location of extraction wells. There is also a need for a process and apparatus for removing contaminants from groundwater and soil that can be implemented by modifying existing vacuum extraction systems. In addition, there is a need for a process and apparatus for removing contaminants from groundwater and soil that enables extraction of contaminants both from the vadose zone and from below the water table through an extraction well having a riser pipe with perforations both above and below the water table. Further, a need exists for a process and apparatus for removing contaminants from groundwater and soil that enables vacuum extraction of contaminants through a well from below the water table when the water table is deeper than the equivalent lift of the vacuum pump connected to the well. There is also a need for a process and apparatus for removing contaminants from groundwater and soil with simplified equipment in that a single vacuum pump can be employed to remove contaminants in both the vapor and liquid phases through a single well or pipe. Additionally, there is a need for a process and apparatus for removing contaminants from groundwater and soil that enables reduction of contaminant concentrations in the extracted groundwater as a result of the mixing of air and water in the vacuum extraction pipe, leading to reduced subsequent water treatment requirements. In addition, there is a need for a process and apparatus for removing contaminants from groundwater and soil that dewaters the saturated zone (groundwater) in the vicinity of the extraction well in some soil conditions, thereby allowing air flow to move through the dewatered soil, which accelerates the extraction rate of contaminants and results in reduced cleanup time. Further, there is a need for a process and apparatus for removing various kinds of contaminants from groundwater and soil, including volatile materials, nonvolatile materials, metal contaminants, and the like.

In addition, it is desirable in a two-phase vacuum extraction system that the flow of both liquid and gas through the well extraction tube be maintained at an adequate velocity of liquid and gas to maximize depression of the water table and accelerate the removal of contaminated groundwater and contaminated soil gas from both the vadose zone and the saturated zone below the water table. When a vacuum extraction pipe is first inserted into a riser pipe, however, the groundwater in the well fills the extraction pipe to the surrounding groundwater level. Subsequently, when a vacuum is applied to the vacuum extraction pipe to initiate the two-phase vacuum extraction process, removal of the groundwater through the vacuum extraction pipe may be difficult or impossible, depending on the length of the extraction pipe situated below the water table. In some instances, it may be necessary to apply extremely high vacuum levels (up to 30 inches of mercury, for example) and/or to manipulate several valves and/or partially or totally withdraw and slowly reinsert the vacuum extraction tube to initiate the two-phase extraction process. Thereafter, when the extraction process is terminated and subsequently restarted in the same well, the recharging of the well with groundwater may lead to the same difficulties encountered at the start-up of the process. Accordingly, a need remains for a method and apparatus for initiating two-phase vacuum extraction of groundwater and soil contaminants which eliminates the need for inconvenient and time-consuming start-up adjustments. There is also a need for a method and apparatus for initiating two-phase vacuum extraction of groundwater and soil contaminants which eliminates the need for moving or removing the vacuum extraction pipe within the riser pipe.

Further, in some instances it may be desirable to remove contaminants from groundwater and soil gases from significant depths, such as thirty feet or greater, and/or to lift the two-phase stream extracted from the well to significant heights, such as in systems wherein the two-phase stream must be lifted over one or more buildings or through ceiling pipes in buildings to reach the separation and treatment location. Accordingly, a need remains for a method and apparatus for initiating two-phase vacuum extraction of groundwater and soil contaminants which enables the extraction from soil of liquids and gases containing contaminants from significant depths. A need also remains for a method and apparatus for initiating two-phase vacuum extraction of groundwater and soil contaminants which enables the conveyance of a two-phase stream of liquids and gases containing soil contaminants to significant heights.

SUMMARY OF THE INVENTION

It is an object of the present invention to provide a process and apparatus for removing contaminants from groundwater and soil which enables contaminant removal from below and/or above the water table.

It is another object of the present invention to provide a process and apparatus for removing contaminants from groundwater and soil which enables contaminant removal from soils of varying air permeability and varying porosity.

It is yet another object of the present invention to provide a process and apparatus for removing contaminants from groundwater and soil which enables increased flexibility in the location of extraction wells.

It is still another object of the present invention to provide a process and apparatus for removing contaminants from groundwater and soil that can be implemented by modifying existing vacuum extraction systems.

Another object of the present invention is to provide a process and apparatus for removing contaminants from groundwater and soil that enables extraction of contaminants both from the vadose zone and from below the water table through an extraction well having a riser pipe with perforations both above and below the water table.

Yet another object of the present invention is to provide a process and apparatus for removing contaminants from groundwater and soil that enables vacuum extraction of contaminants through a well from below the water table when the water table is deeper than the equivalent lift of the vacuum pump connected to the well.

Still another object of the present invention is to provide a process and apparatus for removing contaminants from groundwater and soil with simplified equipment in that a single vacuum pump can be employed to remove contaminants in both the vapor and liquid phases through a single well or pipe.

Another object of the present invention is to provide a process and apparatus for removing contaminants from groundwater and soil that enables reduction of contaminant concentrations in the extracted groundwater as a result of the mixing of air and water in the vacuum extraction pipe, leading to reduced subsequent water treatment requirements.

Yet another object of the present invention is to provide a process and apparatus for removing contaminants from groundwater and soil that dewaters the saturated zone (groundwater)in the vicinity of the extraction well in some soil conditions, thereby allowing air flow to move through the dewatered soil, which accelerates the extraction rate of contaminants and results in reduced cleanup time.

Still another object of the present invention is to provide a process and apparatus for removing various kinds of contaminants from groundwater and soil, including volatile materials, nonvolatile materials, metal contaminants, and the like.

It is another object of the present invention to provide a method and apparatus for initiating two-phase vacuum extraction of groundwater and soil contaminants which eliminates the need for inconvenient and time-consuming start-up adjustments.

It is yet another object of the present invention to provide a method and apparatus for initiating two-phase vacuum extraction of groundwater and soil contaminants which eliminates the need for moving or removing the vacuum extraction pipe within the riser pipe.

It is still another object of the present invention to provide a method and apparatus for initiating two-phase vacuum extraction of groundwater and soil contaminants which enables the extraction from soil of liquids and gases containing contaminants from significant depths.

Another object of the present invention is to provide a method and apparatus for initiating two-phase vacuum extraction of groundwater and soil contaminants which enables the conveyance of a two-phase stream of liquids and gases containing soil contaminants to significant heights.

These and other objects of the present invention (or specific embodiments thereof) can be achieved by providing a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams. Another embodiment of the present invention is directed to an apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe for introducing a gas into the vacuum extraction pipe to initiate two-phase flow within the vacuum extraction pipe, a riser pipe gas inlet for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a two-phase common stream, and a means for receiving the common stream and separating the stream into separate gas and liquid streams.

BRIEF DESCRIPTION OF THE DRAWINGS

Illustrated schematically

Figure 2:
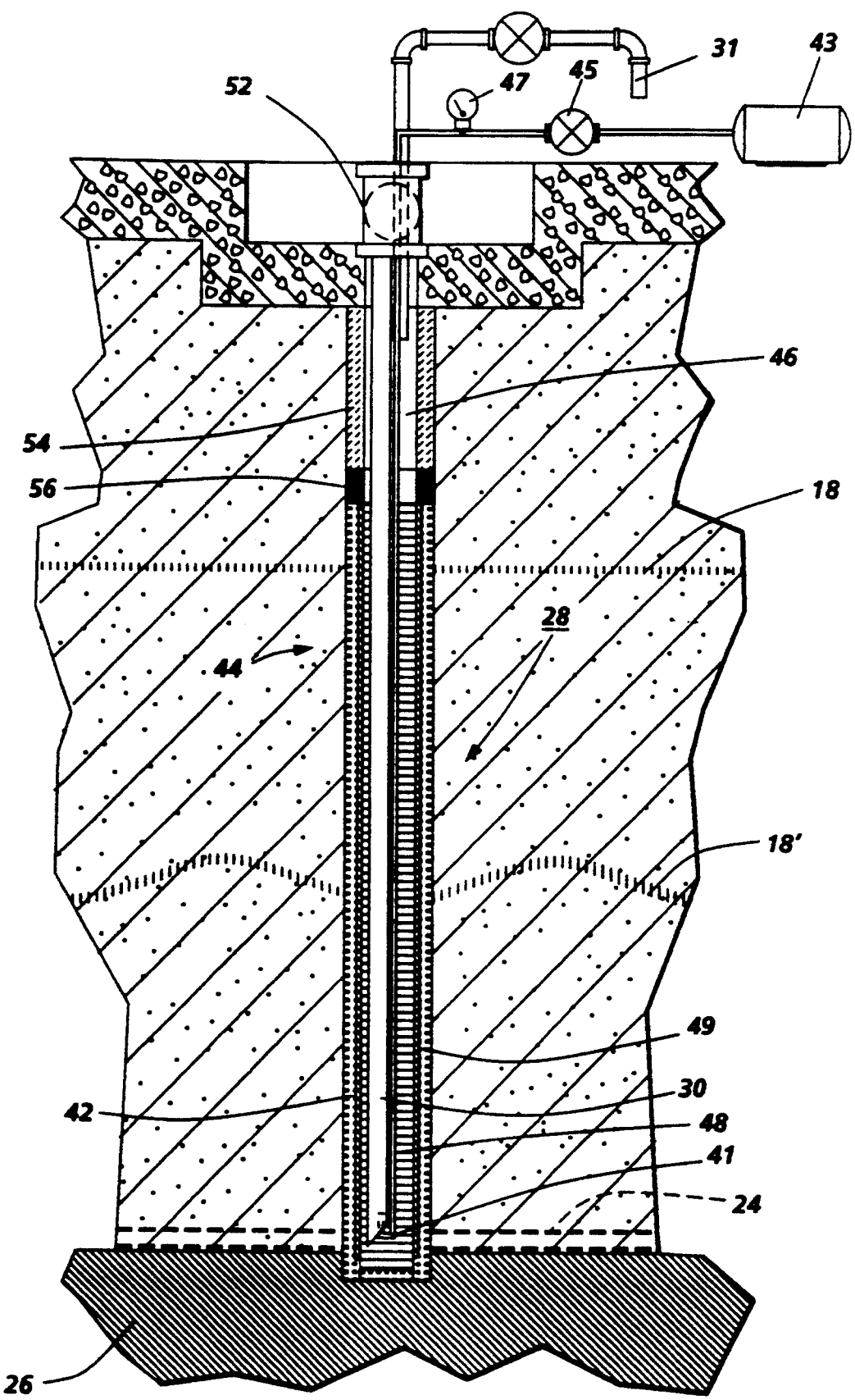

Illustrated schematically in FIG. 2 is a cross-sectional view in side elevation of an extraction well suitable for the present invention.

Figure 3:
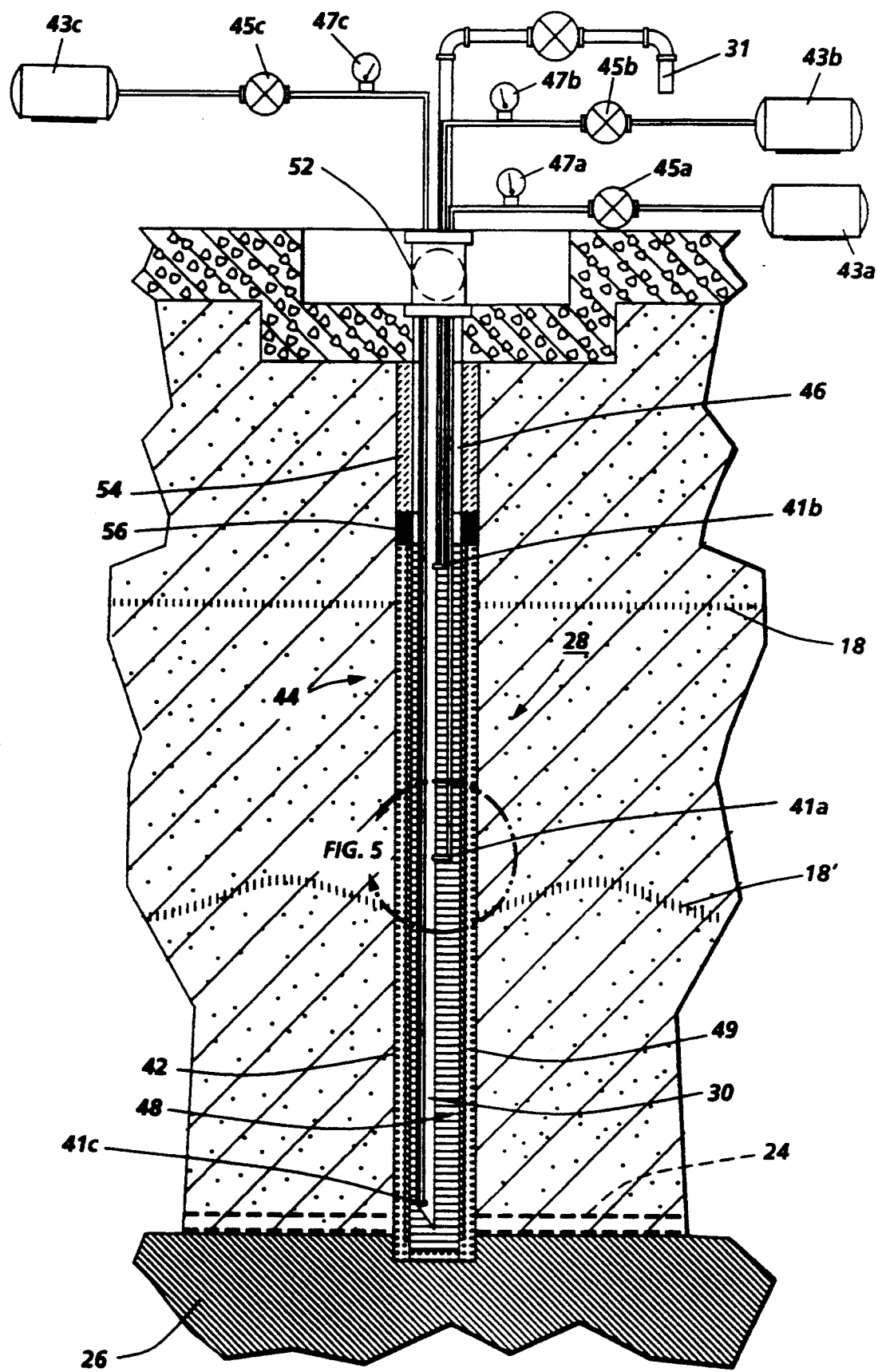

Illustrated schematically in FIG. 3 is a cross-sectional view in side elevation of another extraction well suitable for the present invention.

Figure 4:
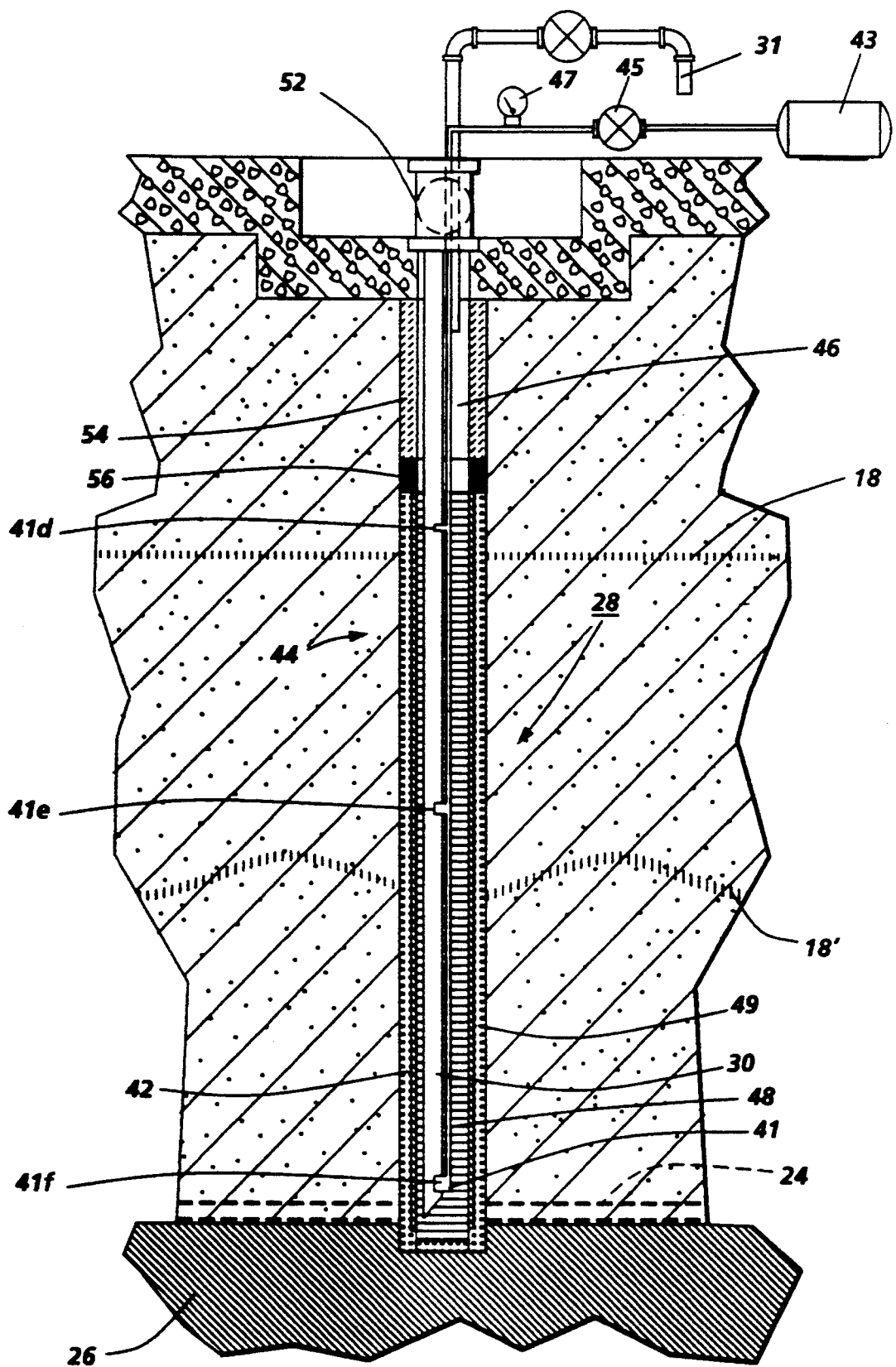

Illustrated schematically in FIG. 4 is a cross-sectional view in side elevation of yet another extraction well suitable for the present invention.

Figure 5:
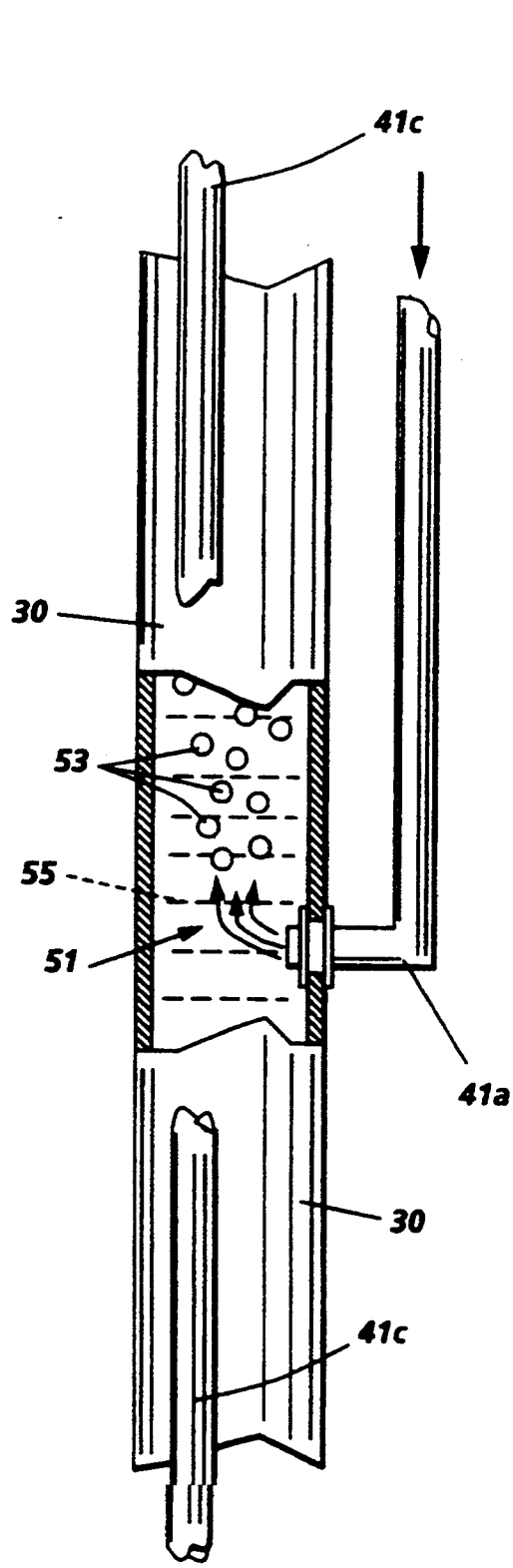
Figure 6:
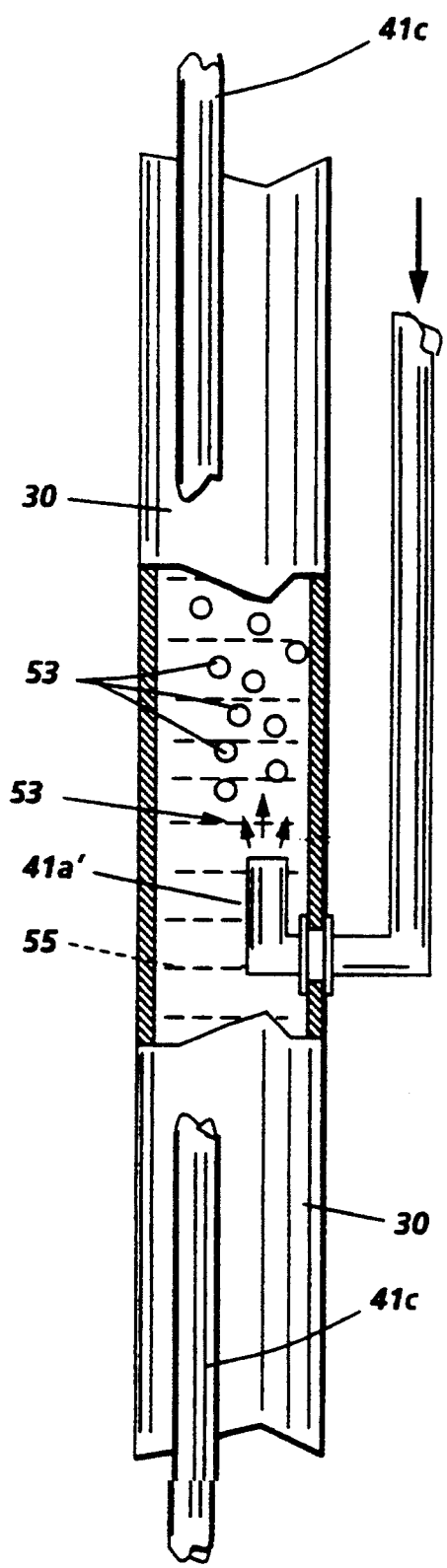
Figure 7:
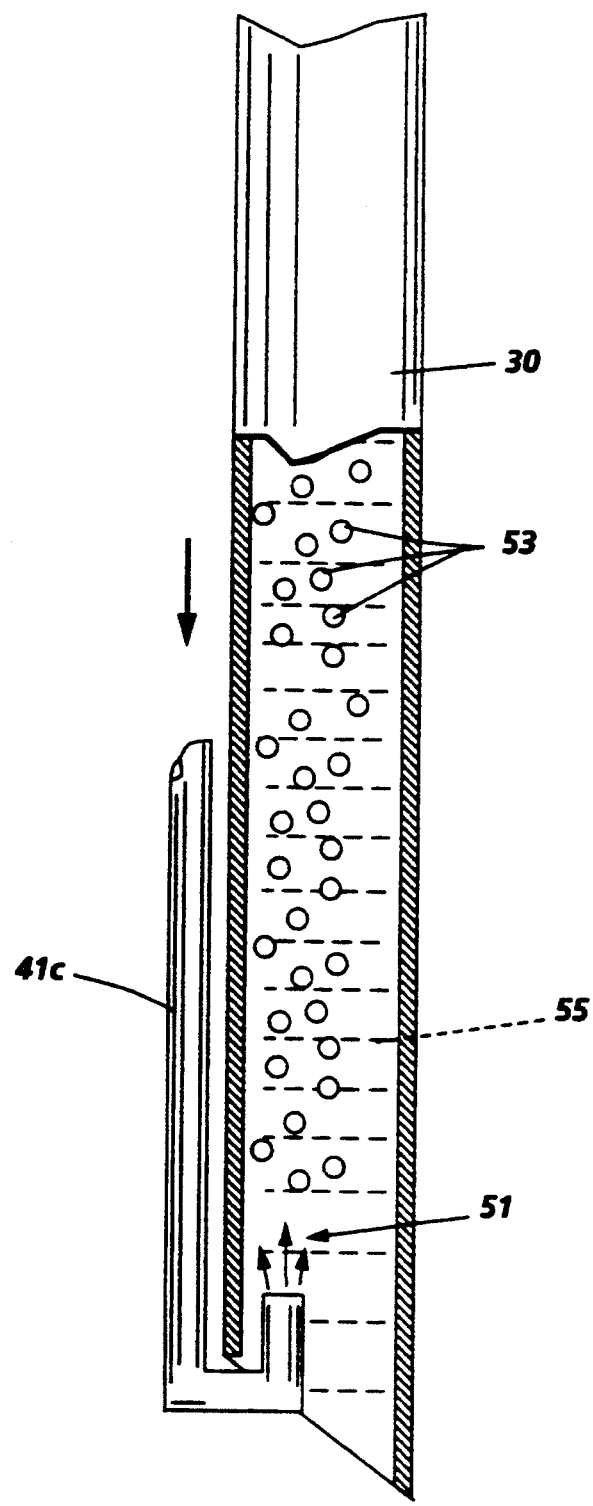

Illustrated schematically in FIGS. 5, 6, and 7 are cross-sectional views in side elevation of three suitable configurations for a gas inlet into a vacuum extraction pipe in an extraction well of the present invention.

Figure 8:
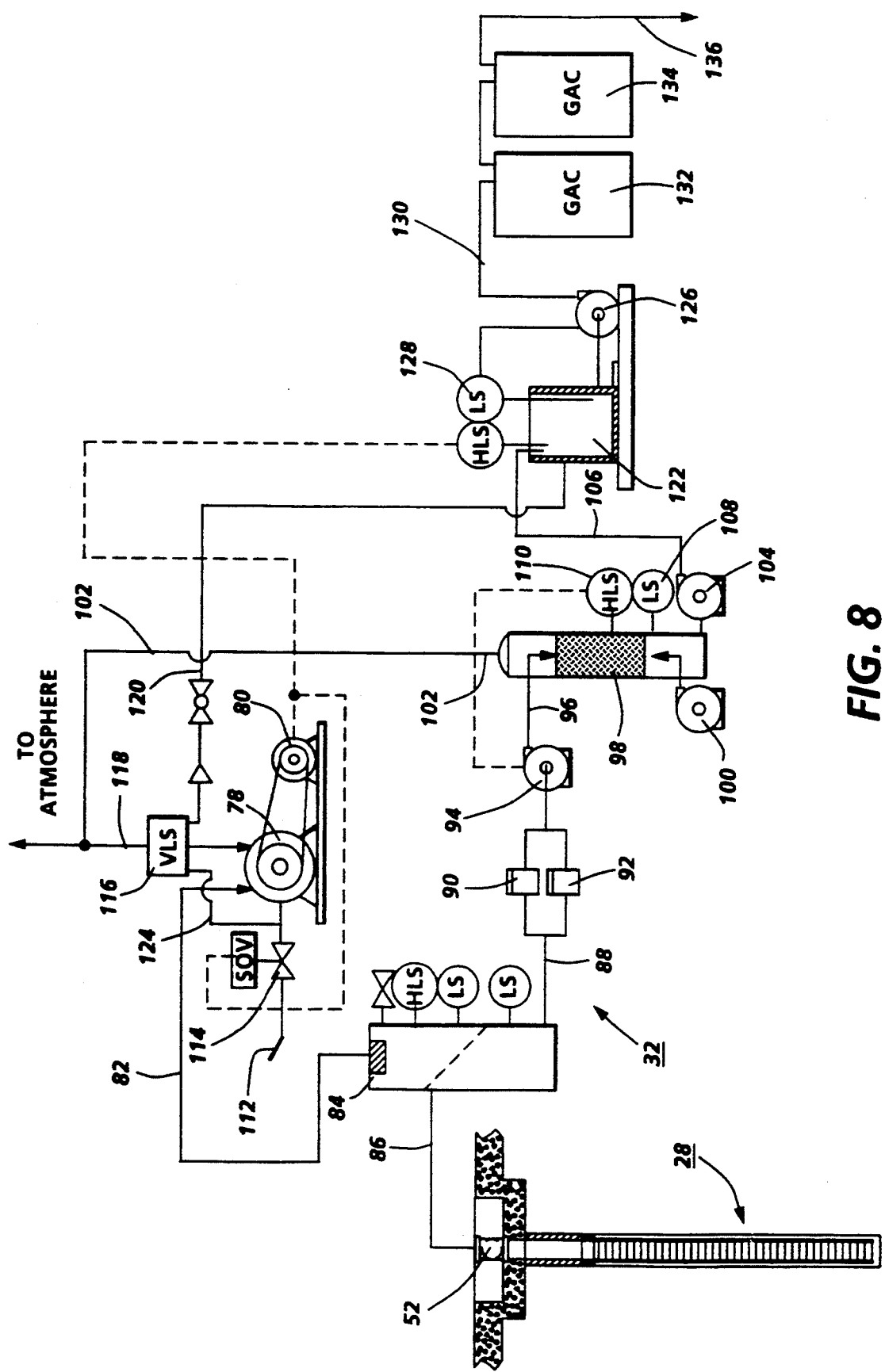

Illustrated schematically in FIG. 8 is a schematic view of an example of an apparatus for handling and treating materials removed from the ground by the vacuum extraction apparatus and process of the present invention.

Figure 9:
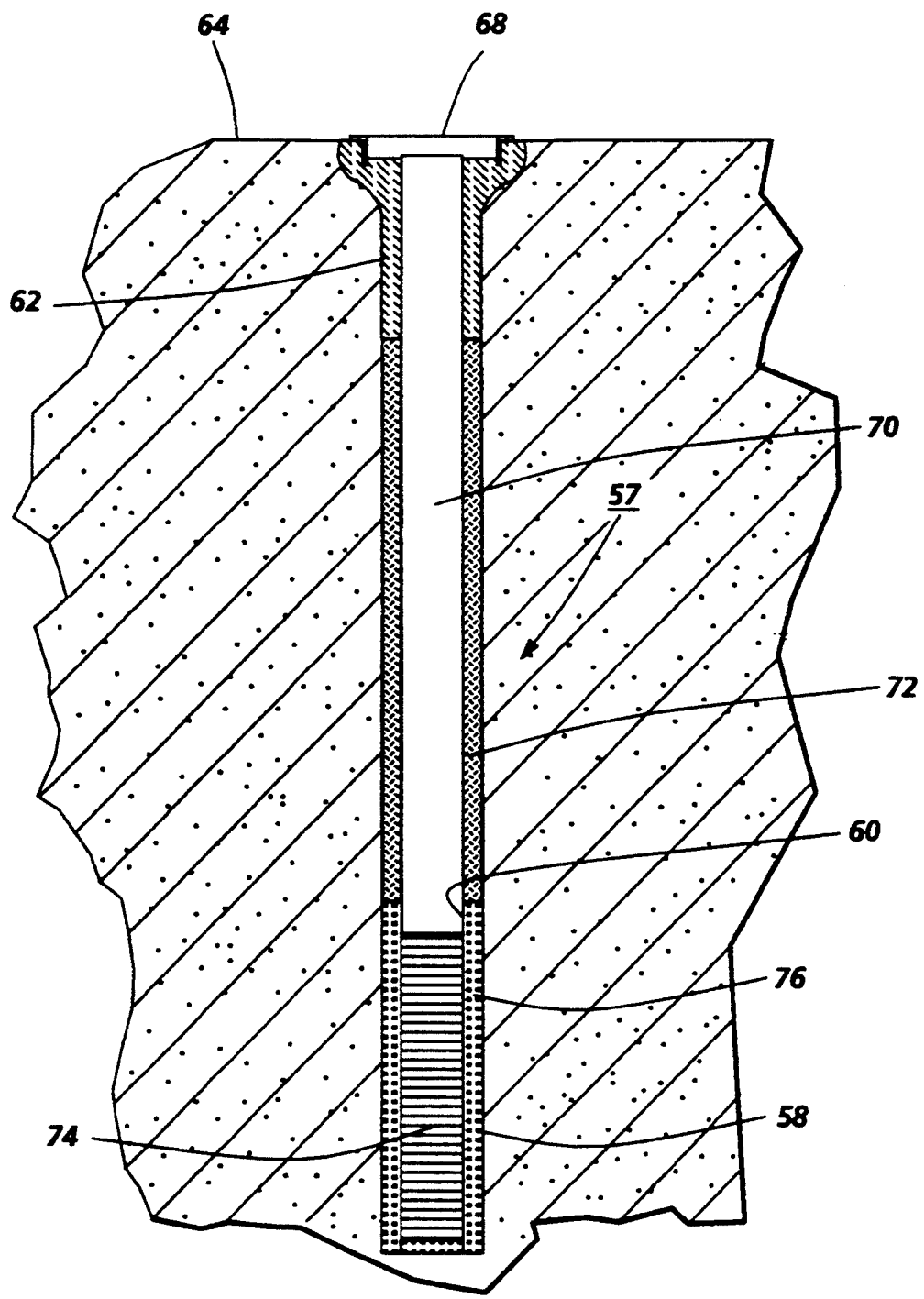

Illustrated schematically in FIG. 9 is a cross-sectional view in side elevation of an air inlet well suitable for use with the present invention.

DETAILED DESCRIPTION OF THE INVENTION

The present invention is directed to a process and apparatus for the removal of contaminants from groundwater and soil. Contaminants can be present in the vadose zone and/or below the water table. The process comprises the steps of providing a borehole in the contaminated area, placing in the borehole a perforated riser pipe in which is situated a vacuum extraction pipe with an opening situated near, at, or at any point below the initial water table within the perforated riser pipe, wherein groundwater flows into the vacuum extraction pipe, applying a vacuum to the riser pipe through the vacuum extraction pipe while introducing a gas into the riser pipe so as to draw soil gases and entrained liquid into the riser pipe and to transport both the gases and the liquid in a two-phase stream to the surface through the vacuum extraction pipe, introducing a gas into the vacuum extraction pipe at a level below the groundwater level in the vacuum extraction pipe to initiate two-phase flow within the vacuum extraction pipe, separating the liquid and the gases in the two-phase stream drawn to the surface, and separately subjecting the separated liquid and gases to appropriate treatment. Treated water can be returned to the soil or disposed of in conventional ways. In one embodiment of the invention, the riser pipe is constructed with perforations (screening) extending both below the natural water table and upward into the unsaturated (vadose) zone. In another embodiment of the invention, the riser pipe is constructed with perforations (screening) extending only below the water table. The unsaturated zone can be the natural vadose zone lying above the natural water table, or an expanded "artificial" vadose zone created when removal of the groundwater through the extraction well causes local lowering of the water table. Placing of the screening so that it extends both below the water table and into the vadose zone allows soil gases, including contaminants in the vapor phase, to be drawn into the riser pipe under the influence of a vacuum generator connected to the vacuum extraction pipe. The gases entrain the liquid phase, so that both phases can be transported to the surface together in a common stream through the vacuum extraction pipe. At the surface, the two phases are separated in a vapor-liquid disengaging vessel, such as a cyclone separator, knock-out pot or other suitable component, and after separation the phases can individually be routed to systems for contaminant removal by further treatment steps. Suitable processes for contaminant removal include filtration, adsorption, air stripping, settling, flocculation. precipitation, scrubbing and the like.

As an alternative, the riser pipe can be constructed so that the screening is at all times below the water table, even in the situation in which removal of water causes local depression of the water table. In such an arrangement, the fluid transported to the surface is predominantly in the liquid phase, although it may still be necessary to provide vapor-liquid separation and individual phase treatment at the surface to deal with phase transformation which may occur as a result of turbulence and pressure reduction at the suction side of the vacuum device.

Figure 1:
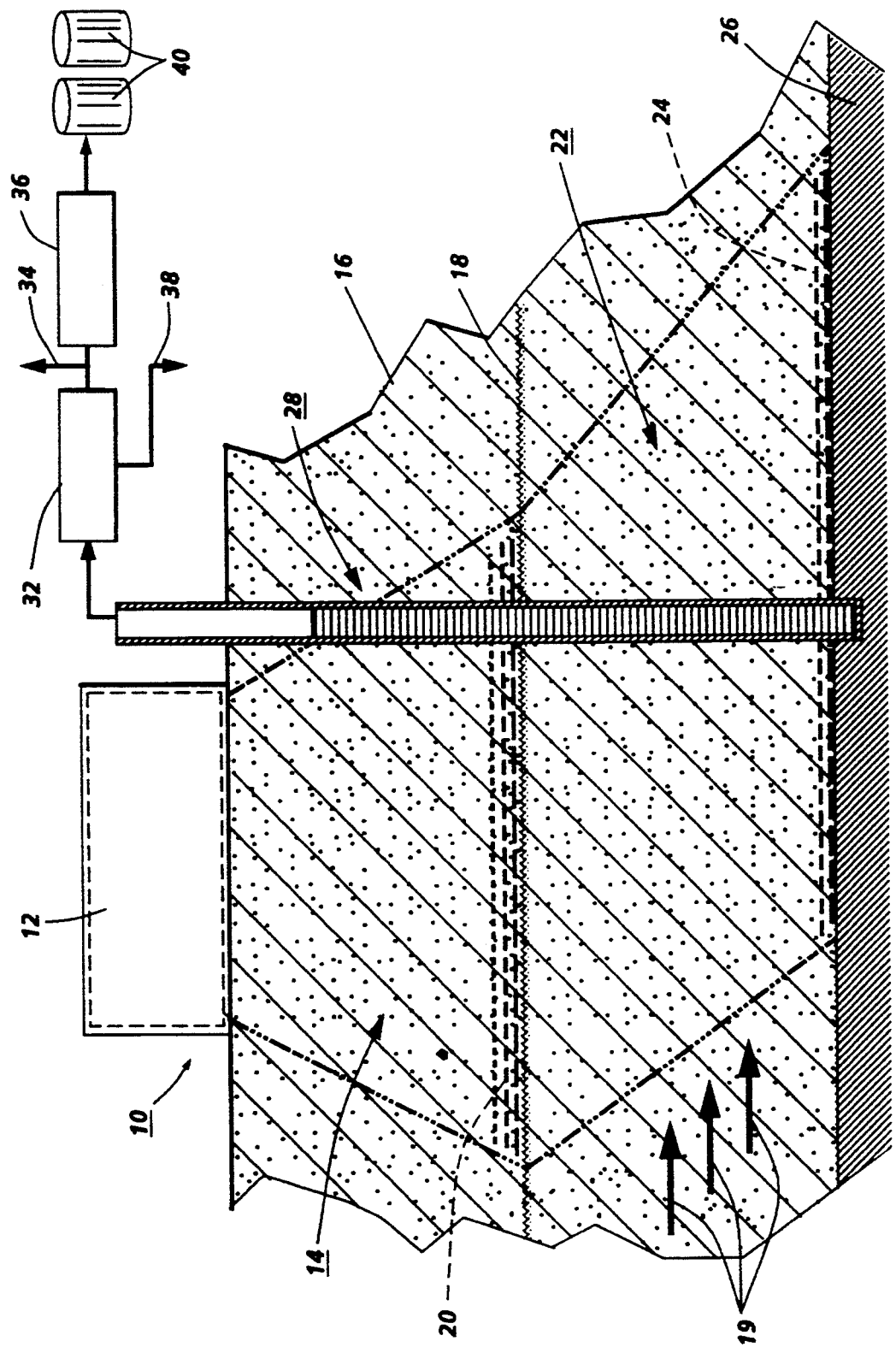
FIG. 1 is a side elevation view in cross section illustrating an arrangement for vacuum extraction of contaminants from a contaminated area of the ground in accordance with the present invention.

FIG. 1 (not necessarily drawn to scale) illustrates schematically a system, designated generally by the reference numeral 10, for vacuum extraction and treatment in accordance with the invention. Seen in FIG. 1 is a source 12 of volatile contaminants, creating a plume 14 of adsorbed, dissolved, or suspended free phase and gaseous phase contaminants in the soil 16 of the vadose (unsaturated) zone. The contaminants making up the plume 14 tend to leach or percolate downwardly toward the natural water table 18. Groundwater is moving in the direction of the arrows 19. Components lighter than water and not dissolved are depicted by the reference numeral 20, and tend to float at the top of the water table. Dissolved contaminants tend to percolate downwardly in a plume 22 below the water table 18, and free-phase components 24 heavier than water tend to migrate downwardly to the aquitard 26.

An extraction well, designated generally by the reference numeral 28, and which will be described in greater detail shortly, is sunk in the area of the plume 14 and extends through the vadose zone and below the natural water table 18. Associated with the extraction well 28 is a vacuum extraction system, designated by the reference numeral 32, preferably designed to generate high vacuum conditions, typically from about 7 to about 29 inches of mercury. Gases removed by the vacuum extraction system 32 can be vented to atmosphere at 34 if within acceptable environmental limits, or further processed, such as by being incinerated or passed to a condenser, granular activated carbon filter, or other such component 36. The component 36 serves to remove contaminants from the extracted gases. Water extracted by the process can be treated by passing it through conventional systems for metals removal, volatile organic compound removal, or other steps of purification. The treated and purified water, if it is of sufficient purity at this stage, can be returned to a sewer or directly to the ground as indicated at 38. Contaminants can be stored in drums 40 for eventual destruction or further processing.

FIGS. 2, 3, and 4 (not necessarily drawn to scale) illustrate extraction wells 28 in greater detail. As illustrated schematically in FIGS. 2, 3, and 4, the extraction well 28 in the illustrated form of the invention includes an elongated borehole 42, into which is placed a perforated riser pipe 44 capped at the bottom. The riser pipe 44 is perforated either below the water table or both below and above the water table. In the embodiment illustrated, the riser pipe includes an imperforate upper portion 46 and a perforate (screened) lower portion 48. The riser pipe 44 can be of any suitable material, such as polyvinyl chloride, metals, such as stainless steel, galvanized steel, or the like, plastics, including Teflon ®, or the like. The screened or perforate portion can have perforations of any desired or suitable shape and size; for example, in one embodiment, the perforated portion can be equipped with 0.010 inch slots. Situated inside riser pipe 44 is vacuum extraction pipe 30. The vacuum extraction pipe 30 can be of any suitable material, such as polyvinyl chloride, metals, such as stainless steel, galvanized steel, or the like, plastics, including Teflon ®, or the like. The upper end of the riser pipe 44 is here shown to be associated with a concrete floor or deck, and is provided with a suitable pipe fitting 52, enabling the riser pipe 44 and the vacuum extraction pipe 30 to be coupled to the remainder of the vacuum extraction system 32 (not seen in FIGS. 2, 3, and 4), with vacuum extraction pipe 30 being in fluid communication with the vacuum extraction system. Vacuum extraction pipe 30 can have a bottom opening within the riser pipe 44 either below the water table, at the water table level, or slightly above but near to the water table. While not necessary, it is preferred that the bottom of vacuum extraction pipe 30 terminate at an angle other than exact parallel with the horizontal; by terminating the pipe at an angle, the surface area of the opening is increased, which enhances the ease of starting the well. Preferred angles for the bottom opening of vacuum extraction pipe 30 are from about 10° to about 80° with respect to the horizontal, and more preferably about 45° with respect to the horizontal, although the angulation can be outside this range.

Also situated at the end of extraction well 28 at or near the ground surface is an air inlet 31, preferably equipped with an air flow gauge (not shown), which permits the introduction of air at any desired pressure, including reduced pressures, atmospheric pressure, or increased or forced pressures, into riser pipe 44. When it is desired to add air at pressures greater than atmospheric pressure, air pressure can be provided by an additional pump (not shown), by connecting the outlet or exhaust of the vacuum pump connected to vacuum extraction pipe 30 to air inlet 31, or the like. The air flow rate through air inlet 31 can range from nearly zero to any value less than the CFM rated capacity of the vacuum pump connected to vacuum extraction pipe 30. While some air flow is necessary at system start-up, after the process has been in operation for a period of time, the air flow may in some instances be reduced to zero, with no air being introduced into the well through air inlet 31 and maximum vacuum being applied to the sub-surface soil and water. In addition, the air introduced through air inlet 31 can, if desired, be heated to improve the extraction of some contaminants. Further, air inlet 31 can be used as an inlet for introducing other materials or chemicals into the riser pipe and extraction stream, since chemicals or materials so introduced will pass down with the inlet air through the riser pipe to the bottom thereof, and then back up with the water and air mixture through vacuum extraction pipe 30, thus chemically or otherwise interacting with the water and air mixture. For example, oxidizers or surfactants or other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, gas inlet or inlets can be employed to introduce into the vacuum extraction pipe nutrients for biotransformation, such as cellulose or the like, or for introducing nitrogen to enhance anaerobic processes or oxygen to enhance aerobic processes. Further information regarding biological processes for treating soil contaminants is disclosed in, for example, W. K. Ahlert et al., "In situ Bioremediation of Soil Contaminated with Methyl Benzene Species," M. A. Franson, "In Situ Bioremediation of Unleaded Gasoline Contaminated Ground Water, Plainfield, Conn., A Case Study," and M. Leavitt et al., "Implications of Surfactant Augmentation for In Situ Bioremediation Systems," all contained in In Situ Treatment of Contaminated Soil and Water, Proceedings of the 1992 U.S. EPA/A&WMA international Symposium, Air and Waste Management Association (Pittsburgh 1992); and Subsurface Restoration Conference, Jun. 21-24, 1992, Dallas, Tex. (Rice University Dept. of Envi. Sci. & Eng., Houston, Tex. 1992); the disclosures of each of which are totally incorporated herein by reference.

Liquid drawn up through vacuum extraction pipe 30 generally is in two-phase form, namely droplets, mist, and/or vapor entrained in liquid, as opposed to slug flow. Air flow through the system is provided by one or more of the following: air from the unsaturated (vadose) zone; air from the dewatered saturated zone; air from the air inlet mechanism 31, at reduced pressures, atmospheric pressure, or forced pressures; and air from gas inlet or inlets 41 at atmospheric pressure or forced pressures. Thus, it is not required that air be extracted from the ground in the vicinity of the extraction well. Generally, a high vapor/air velocity is maintained through the system. Air velocity in the vacuum extraction pipe should be sufficient to carry or lift water in the vapor phase, either droplets of various sizes, or the like, entrained in the air. Air velocity values in the range of from about 1 foot per second to about 200 feet per second or greater generally suffice.

Vacuum extraction pipe 30 is equipped with at least one gas inlet 41. As illustrated in FIG. 2, the vacuum extraction pipe 30 is equipped with a single gas inlet 41. As illustrated schematically in FIG. 3, the vacuum extraction pipe 30 is equipped with three gas inlet tubes 41a, 41b, and 41c. As illustrated schematically in FIG. 4, vacuum extraction pipe 30 is equipped with three gas inlets 41a, 41b, and 41c, all feeding from a single gas inlet tube 41.

More specifically, as shown in FIG. 2, gas inlet 41 enters vacuum extraction pipe 30 from the bottom opening of vacuum extraction pipe 30. Alternatively (not shown), gas inlet 41 can enter vacuum extraction pipe 30 through an opening in the side of vacuum extraction pipe 30. Gas inlet 41 is in fluid communication with a gas supply, which can be either atmospheric air or some other desired gas, and with optional air compressor 43. A tank containing compressed air can also serve as the gas supply. The gas supply to gas inlet 41 is controlled through valve 45 and the pressure in gas inlet 41, if desired, can be monitored with optional pressure gauge 47. In addition, if desired, an automatic controller for turning valve 45 on and off and/or for controlling the duration and/or pressure of the gas applied to vacuum extraction pipe 30 from gas inlet 41 can be added to the configuration of gas inlet 41.

As shown in FIG. 3, gas inlets 41a, 41b, and 41c enter vacuum extraction pipe 30 through openings in the sides of vacuum extraction pipe 30. Gas inlet 41b can be situated above, at, near, or below the level of the water table (and correspondingly above, at, near, or below the approximate level of groundwater which has entered vacuum extraction pipe 30 prior to initiation of the pumping process). Gas inlet 41a is generally situated at a level below the natural water table but above the level to which the groundwater drops after the pumping process has been in operation for a period of time. Gas inlet 41c is situated at a level below the level to which the groundwater drops after the pumping process has been in operation for a period of time. While gas inlet 41c is shown in this illustration as entering vacuum extraction pipe 30 through an opening in the side wall of vacuum extraction pipe 30 immediately above the bottom opening of vacuum extraction pipe 30, gas inlet 41c may also enter vacuum extraction pipe 30 either directly through the bottom opening of vacuum extraction pipe 30 or through either side of vacuum extraction pipe 30. It must be emphasized that the number of gas inlets in this embodiment of the invention is not limited to two or three; for example, in a well 200 feet deep, a greater number of gas inlets may be desired. In addition, it must be emphasized that the gas inlet openings into vacuum extraction pipe 30 need not be evenly spaced with respect to each other; the length of each gas inlet may vary as desired for optimal operation of the well. Gas inlets 41a, 41b, and 41c are each in fluid communication with gas supplies, which can be either atmospheric air or some other desired gas, and with optional air compressors 43a, 43b, and 43c. Tanks containing compressed air can also serve as the gas supplies. The gas supplies to gas inlets 41a, 41b, and 41c are each controlled through valves 45a, 45b, and 45c, and the pressures in gas inlets 41a, 41b, and 41c, if desired, can be monitored with optional pressure gauges 47a, 47b, and 47c. In addition, if desired, an automatic controller for turning valves 45a, 45b, and 45c on and off and/or for controlling the duration and/or pressure of the gas applied to vacuum extraction pipe 30 from gas inlets 41a, 41b, and 41c can be added to the configuration of gas inlets 41a, 41b, and 41c.

As shown in FIG. 4, gas inlets 41d, 41e, and 41f enter vacuum extraction pipe 30 through openings in vacuum extraction pipe 30. Gas inlets 41d, 41e, and 41f are all in fluid communication with main gas inlet 41. The diameter of gas inlet 41d, situated closest to the top of vacuum extraction pipe 30, is smaller than the diameter of gas inlet 41e situated between gas inlets 41d and 41f. The diameter of gas inlet 41e is smaller than the diameter of gas inlet 41f situated closest to the bottom opening of vacuum extraction pipe 30. Gas inlet 41d can be situated above, at, near, or below the level of the water table (and correspondingly above, at, near, or below the approximate level of groundwater which has entered vacuum extraction pipe 30 prior to initiation of the pumping process). Gas inlet 41e is generally situated at a level below the natural water table but above the level to which the groundwater drops after the pumping process has been in operation for a period of time. Gas inlet 41f is situated at a level below the level to which the groundwater drops after the pumping process has been in operation for a period of time. While gas inlet 41f is shown in this illustration as entering vacuum extraction pipe 30 through an opening in the side wall of vacuum extraction pipe 30 immediately above the bottom opening of vacuum extraction pipe 30, gas inlet 41f may also enter vacuum extraction pipe 30 either directly through the bottom opening of vacuum extraction pipe 30 or through either side of vacuum extraction pipe 30. It must be emphasized that the number of gas inlets in this embodiment of the invention is not limited to two or three; for example, in a well 200 feet deep, a greater number of gas inlets may be desired. In addition, it must be emphasized that the gas inlet openings into vacuum extraction pipe 30 need not be evenly spaced with respect to each other; the distances between gas inlets may vary as desired for optimal operation of the well. The gas supply to gas inlet 41 is controlled through valve 45 and the pressure in gas inlet 41, if desired, can be monitored with optional pressure gauge 47. In addition, if desired, an automatic controller for turning valve 45 on and off and/or for controlling the duration and/or pressure of the gas applied to vacuum extraction pipe 30 from gas inlet 41 can be added to the configuration of gas inlet 41. The relative diameters of gas inlet openings 41d, 41e, and 41f are selected so that when compressed air is applied to gas inlet 41, the compressed air will preferentially be directed first to 41d, followed by 41e, and then followed by 41f, thus resulting in the top, middle, and bottom sections of the vacuum extraction pipe being started in sequence. The opening of smallest diameter, 41d, is situated at the top and the opening of largest diameter, 41f, is situated at the bottom because more compressed air is needed to overcome the effect of the head due to the depth of the well and the length of the extraction tube needed to start the system.

In operation, gas is introduced into vacuum extraction pipe 30 either before, while, or after a vacuum is applied to vacuum extraction pipe 30 to initiate two-phase flow within vacuum extraction pipe 30. In the embodiment wherein vacuum extraction pipe 30 is equipped with a single gas inlet 41 as illustrated in FIG. 2, gas is applied through gas inlet 41 continuously as vacuum is applied to vacuum extraction pipe 30 until two-phase flow is established within vacuum extraction pipe 30, at which point the flow of gas through gas inlet 41 is halted. The actual duration for application of gas through gas inlet 41 will vary depending on factors such as the depth of the well, the depth within the well of the gas inlet 41, the depth of groundwater contained within vacuum extraction pipe 30, the dimensions of the well, vacuum extraction pipe 30, and gas inlet 41, the pressure of gas applied through gas inlet 41, and the like. Typical duration times for wells 4 inches in diameter and wherein gas is introduced at a pressure of from about 20 to about 60 pounds per square inch are from about 15 to about 20 seconds when the groundwater level is less than 15 feet deep and about 45 seconds when the groundwater level is from about 18 to about 25 feet deep. In some instances, durations for applying gas through gas inlet 41 may be 5 minutes or greater.

In embodiments of the present invention wherein vacuum extraction pipe 30 is equipped with a multiplicity of gas inlets, as illustrated in FIG. 3 for example, gas is typically applied first through uppermost gas inlet 41b continuously as vacuum is applied to vacuum extraction pipe 30 until two-phase flow is established within vacuum extraction pipe 30 from the depth of gas inlet 41b. At this point, the flow of gas through the inlet next in depth, which in FIG. 3 is gas inlet 41a, is initiated and maintained until two-phase flow is established within vacuum extraction pipe 30 from the depth of gas inlet 41a. Subsequently, the flow of gas through the inlet next in depth, which in FIG. 3 is gas inlet 41c, is initiated and maintained until two-phase flow is established within vacuum extraction pipe 30 from the depth of gas inlet 41c. The flow of gas through each inlet can be terminated once two-phase flow is established from that depth, although it is preferred to maintain at least some overlap between the flow of gas through one inlet and the flow of gas through the inlet next in depth to ensure that two-phase flow does not cease in the vacuum extraction pipe at any time. For example, in a particular well, gas might be introduced first through uppermost gas inlet 41b for a period of about 10 seconds, after which two-phase flow is established within the vacuum extraction tube from the depth of gas inlet 41b, followed by maintaining gas flow through gas inlet 41b while also permitting gas to flow through gas inlet 41a for a period of about 5 seconds, followed by terminating the flow through gas inlet 41b while allowing gas to continue to flow through gas inlet 41a for a period of 15 seconds, after which two-phase flow is established within the vacuum extraction tube from the depth of gas inlet 41a, followed by maintaining gas flow through gas inlet 41a while also permitting gas to flow through gas inlet 41c for a period of about 5 seconds, followed by terminating the flow through gas inlet 41a while allowing gas to continue to flow through gas inlet 41c for a period of 20 seconds, after which two-phase flow is established within the vacuum extraction tube from the depth of gas inlet 41c, followed by terminating the flow through gas inlet 41c. The duration of flow through each inlet and the duration of overlap for flow from two or more inlets will vary with each well. It is also possible, however, to initiate flow through each inlet sequentially, with no overlap between the flow through one inlet and the flow through another inlet, or to initiate flow in multiple inlets in some order other than sequentially by increasing depth. Further, flow through multiple gas inlets can be initiated simultaneously. If desired, the flow duration through each gas inlet can be controlled automatically by running each gas inlet 41a, 41b, and 41c through a timer control system.

Generally, flow through the gas inlet or inlets is ceased once the two-phase vacuum extraction process has been successfully initiated. At various times in the extraction process, however, the flow through vacuum extraction pipe 30 may vary from the desired two-phase flow to some other form of flow, such as slug flow. At these times, gas may also be introduced through gas inlet or inlets 41 to convert the flow in vacuum extraction pipe 30 back to the desired two-phase form.

The gas inlet or inlets can be of any suitable configuration, with a few examples of suitable configurations being illustrated schematically (and not necessarily to scale) in FIGS. 5, 6, and 7. As illustrated schematically in FIG. 5, gas inlet 41a enters vacuum extraction pipe 30 through an opening in the side of vacuum extraction pipe 30 and terminates at an approximate right angle to the wall of vacuum extraction pipe 30. While not required, it is preferred that the opening of gas inlet 41a be situated in relative close proximity to the inner wall of vacuum extraction pipe 30 to minimize frictional forces as air 51 is introduced into vacuum extraction pipe 30 through gas inlet 41a to initiate two-phase flow of gas 53 and liquid 55 in vacuum extraction pipe 30.

As illustrated schematically in FIG. 6, gas inlet 41a' enters vacuum extraction pipe 30 through an opening in the side of vacuum extraction pipe 30 and terminates at an approximate parallel angle to the wall of vacuum extraction pipe 30. While not required, it is preferred that the opening of gas inlet 41a' be situated in relative close proximity to the inner wall of vacuum extraction pipe 30 to minimize frictional forces as air 51 is introduced into vacuum extraction pipe 30 through gas inlet 41a' to initiate two-phase flow of gas 53 and liquid 55 in vacuum extraction pipe 30.

As illustrated schematically in FIG. 7, gas inlet 41c enters vacuum extraction pipe 30 through the bottom opening of vacuum extraction pipe 30 and terminates at an approximate parallel angle to the wall of vacuum extraction pipe 30. While not required, it is preferred that the opening of gas inlet 41c be situated in relative close proximity to the inner wall of vacuum extraction pipe 30 to minimize frictional forces as air 51 is introduced into vacuum extraction pipe 30 through gas inlet 41c to initiate two-phase flow of gas 53 and liquid 55 in vacuum extraction pipe 30.

The gas inlet or inlets 41 can be either flexible or rigid, and can be of any suitable material, such as polymers and plastics, including polyvinyl chloride, Teflon ®, polyethylene, polypropylene, or the like, metals, such as stainless steel, galvanized steel, copper, brass, or the like, or any other suitable material. The gas inlet or inlets 41 can be of any desired or suitable dimensions to enable the desired rate of flow through the vacuum extraction pipe, and typically will vary depending on the dimensions of the vacuum extraction pipe, the depth of the well, the nature of the packing around the well, and the like. Typically, in a well about 4 inches in diameter, for example, the vacuum extraction pipe is from about $\frac{1}{2}$ inch to about 3 inches in diameter and the gas inlet tubes are from about $\frac{1}{4}$ to about $\frac{1}{2}$ inch in diameter. Other relative dimensions, however, may of course be employed.

Any desired pressure can be employed for the gas introduced into vacuum extraction pipe 30 through gas inlet or inlets 41. Typical, pressures range from atmospheric pressure outside the well (in which case no air compressor is required) to about 100 pounds per square inch, with preferred pressures being from about 20 to about 60 pounds per square inch, more preferably from about 30 to about 50 pounds per square inch, although the pressure can be outside these ranges. Greater pressures initiate two-phase flow within the vacuum extraction pipe more rapidly, and may also be more desirable at greater relative depths of water (with relative depth in this instance referring to the difference in depth between the gas inlet and the groundwater level within the vacuum extraction pipe).

Any desired gas can be introduced into the vacuum extraction pipe through the gas inlet or inlets. Ambient air may be selected as the most inexpensive gas. In addition, the air introduced through gas inlet or inlets 41 can, if desired, be heated to improve the extraction of some contaminants. Further, gas inlet or inlets 41 can be used as an inlet for introducing other materials or chemicals into the riser pipe and extraction stream for chemically or otherwise interacting with the water and air mixture. For example, oxidizers or surfactants or other chemicals can be introduced for the treatment of waterborne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, the gas inlet or inlets can be employed to introduce into the vacuum extraction pipe nutrients for biotransformation, such as cellulose or the like, or for introducing nitrogen to enhance anaerobic processes or oxygen to enhance aerobic processes.

Returning to FIGS. 2, 3, and 4, the upper portion 46 of the riser pipe 44 is surrounded by a low permeability grout, such as bentonite cement 54, and below the grout 54 by a bentonite seal 56. The area within the borehole 42 surrounding the slotted lower portion 48 of the riser pipe 44 and part of the upper portion 46 above the slotted lower portion 48 is packed with fine screened sand 49, to facilitate the flow of gas and liquid from the surrounding soil into the riser pipe 44. In a preferred form of the invention, the extraction well 28 is constructed so that the screened lower portion 48 extends below the natural water table and upwardly into the vadose zone. The vadose zone into which the screened lower portion 48 extends can be the natural water table 18, or the expanded artificial vadose zone created when prolonged removal of groundwater through the extraction well causes local lowering of the water table, as indicated by the reference numeral 18' in FIGS. 2, 3, and 4. As shown, the depressed water table 18' is situated so that vacuum extraction pipe 30 is below the water level; in some situations, such as when the process is performed in extremely sandy soil, the depressed water table 18' may drop to the level of the bottom of vacuum extraction pipe 30. Placement of the screened lower portion 48 of the riser pipe 44 both below the water table and in the vadose zone allows soil gases (the vapor phase) to be drawn into the well under the influence of vacuum created by the extraction system 32 and to entrain the liquid phase so that both phases can be transported to the surface together. As will be explained, at the surface, the two phases can be separated and differently treated.

Alternatively (not shown), the extraction well 28 can be so constructed that the screening of the lower portion 48 is entirely submerged, i.e., disposed below the natural or actual water table, even after withdrawal of water under the influence of the vacuum extraction system 32. In the latter case, the fluid transported to the surface is predominantly in the liquid phase, although the influence of the vacuum generally results in the presence of a gas phase comprising volatilized liquids.

FIG. 8 (not necessarily drawn to scale) illustrates schematically in greater detail the vacuum extraction system 32 and the steps and apparatus for treating extracted material. A vacuum pump 78, driven by electric motor 80, is in fluid communication through a pipe 82, knock-out pot 84 and pipe 86 with the pipe fitting 52 of extraction well 28. The knock-out pot 84 can be of conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the liquid phase through filtration and stripping steps. Filtration is provided in the illustrated embodiment by parallel filters 90 and 92 which can alternately or simultaneously be used in a conventional manner. Cut-off valves, omitted in the drawings for clarity, permit either filter 90 or 92 to be isolated and each filter to be removed, cleaned, or replaced. Suitable pressure gauges (not shown) can be placed on the suction and discharge sides of the filters 90 and 92 to indicate filter loading. Examples of suitable filters 90 and 92 include SQ micron nylon filters, sold by Rosedale Products, Incorporated, capable of passing 222 gpm at 150 psi. Other separation techniques and apparatus can also be used.

A pump 94, for erosion resistance preferably of the single stage progressive cavity (screw) type, serves to draw off the liquid phase effluent of the knock-out pot 84. An example of a suitable pump is sold by the Nemo Pump Division of Netzsch Incorporated, of Exton, Pa., Model Ne-30A. Here, too, other suitable apparatus can be used.

In the illustrated embodiment, the liquid phase is fed from the pump 94 through a pipe 96 to an optional air stripper assembly 98, the function of which is to remove from the effluent volatile organic compounds. A blower 100 associated with the air stripper assembly 98 delivers a flow of warm air through the housing of the air stripper assembly 98, carrying off the volatile organic compounds through the vent 102 to atmosphere or further processing (not shown). A transfer pump 104, discharging to a pipe 106, serves to transport liquid from the sump of the air stripper assembly 98 for further processing. The transfer pump 104 can be turned off in response to a low level switch 108 associated with the air stripper assembly 98. A high level switch 110 associated with the air stripper assembly 98 controls the pump 94 in response to high water level in the air stripper assembly 98. The air stripper assembly 98 can be a conventional "off-the-shelf" unit, familiar to those skilled in the art.

The optional air stripper assembly 98 can, if desired, be omitted, and the effluent of the pipe 96 joined with the effluent of the pipe 120. It is hypothesized that the intimate mixing of the air and water during extraction (at which time groundwater is extracted in an air stream under vacuum) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

As indicated above, under the influence of the vacuum pump 78 the vapors separated from the two-phase effluent from the extraction well 28 are drawn to vacuum pump 78. In the illustrated embodiment of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 can be drawn off through a line 124 to join the flow in the make up water line 112 servicing the liquid ring pump 78.

A pump 126, controlled by a low level cut-off switch 128, draws liquid from the sump 122 and propels it through a pipe 130 for further processing. In the illustrated embodiment, the liquid is passed in two stages through canisters 132 and 134 containing granular activated carbon. Other contaminant removal steps or techniques can be used. The treated water emerges through a pipe 136 and is of sufficient purity to allow its return to the soil or a sewer without further treatment.

FIG. 9 (not necessarily drawn to scale) illustrates schematically an example of an optional air inlet well 57. The air inlet well 57 comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar 62, extending to the ground surface 64. Suitable covers 68 can be provided in association with the collar 62 to cover selectively the injection well as desired. Cover 68 generally is air permeable, at least to some extent. Surrounding a medial portion 70 of the pipe 60 within the borehole 58 is a bentonite slurry 72, which provides a gas-tight seal between the pipe 60 and the borehole 58. The slotted lower portion 74 of the pipe 60 is surrounded by gas-permeable packed sand 76. As will now be apparent, the pipe 60 facilitates the injection of air into the zone surrounding the plume 14 (shown in FIG. 1).

One advantage of the application of vacuum extraction in accordance with the present invention is that the rate of production of groundwater may be significantly increased over conventional single phase flow rates. By applying vacuum to the subsurface using the vacuum extraction pipe 30 and vacuum extraction system 32 as described above, water is drawn from the soil by the fluid dynamic effects of sweeping air and soil gases over the aquifer surface toward the well and also by the artificial creation of a low head (water pressure) inside the riser pipe 44 The low head in the riser pipe 44 makes it, in effect, a low point in the hydraulic system so that water in the surrounding soil readily flows to it.

Artificially increasing the rate of production of groundwater over what can be achieved with conventional pumps is especially beneficial in subsurface formations through which natural recharge is slow. In addition to increasing the size of the groundwater capture zone around the extraction well 28, operation of the above-described apparatus 10 depresses the natural water table, thereby increasing the volume of the vadose zone which is subject to clean up by the vapor extraction mechanism generated by the apparatus 10. Tangible benefits include shortening of the duration of the treatment time and reduction of the cost of the overall contaminant removal effort.

The apparatus and process of the present invention, being equipped with the vacuum extraction pipe and the air inlet means, enable removal of liquid and/or gaseous contaminants from soils of varying air permeability and varying porosity, since the extraction system no longer depends upon the air permeability or porosity conditions of the soil to provide air flow and water flow into the riser pipe sufficient to match the vacuum pump characteristics. The air inlet, when equipped with a valve, allows the adjustment of the introduced air flow to match the specific site soil conditions. The air inlet and valve provide air to displace water from the well through the vacuum extraction pipe. In addition, the present invention enables increased flexibility in the location of extraction wells, since soil conditions with respect to air flow through the soil are not critical, thus allowing the well to be situated in areas of greatest contamination without considering irregular or difficult soil conditions in those areas. Further, the vacuum extraction pipe and the air inlet mechanism enable vacuum extraction of contaminants through wells from below the water table even when the water table is deeper than the equivalent lift of the vacuum pump connected to the well. Thus, existing wells equipped with vacuum pumps can be modified by the addition of a vacuum extraction pipe and an air inlet mechanism as provided with the present invention, thus enabling the existing pump to remove contaminants from below the water table. In addition, when the water table is at a depth of greater than about 35 feet, the lift required to remove liquid contaminants can be expected to be greater than any commercially available vacuum pump; the apparatus and process of the present invention, however, enable removal of liquid and gaseous contaminants even from depths of 35 feet or greater. Nearly any rate vacuum pump can be used for extraction with the present invention; a low CFM rate pump can still extract water from a substantial depth of water table. Additionally, the apparatus and process of the present invention are suitable for extraction of contaminants by systems equipped to extract from only below the water table and by systems equipped to extract from both the vadose zone and below the water table.

The apparatus and process of the present invention enable the above advantages while also enabling this process in wells of great depth. The apparatus and process are suitable for use in wells of 100 feet, 200 feet, or more. In wells wherein the natural water table is situated at a depth of 20 feet or greater, and in wells wherein it is desired to lower the groundwater level to depths of 60 feet or greater, embodiments of the present invention employing multiple gas inlets are generally preferred. Further, the apparatus and process of the present invention enable the above advantages while also enabling rapid, simple, and efficient start-up of the pumping process. For example, if a well is situated in an area where the natural water table is at a depth of 10 feet and if the level of groundwater drops to a depth of 45 feet during the vacuum extraction process, the vacuum extraction pipe will initially contain groundwater at a depth of about 10 feet below the ground surface prior to initiation of the extraction process. If the process is initiated by moving the vacuum extraction pipe to a level slightly below the groundwater level and continuing to adjust the height of the vacuum extraction pipe within the riser pipe until the groundwater level drops to 45 feet, the start-up process will typically require at least one person, and more often at least two persons, at least 45 minutes to complete the start-up process. In contrast, with the apparatus and process of the present invention, the height of the vacuum extraction pipe within the riser pipe need not be adjusted. If performed manually, the start-up process for each well typically requires one person about 45 seconds to complete, and if performed by an automated process, start-up requirements are lessened to an even greater degree in terms of time and numbers of persons required. Further, the apparatus and process of the present invention minimize the "down time" of operating vacuum extraction wells. If the two-phase flow through the vacuum extraction pipe is halted, subsequent restart of the well can be time-consuming, and since groundwater flows into the area around the well between the time of the halt of operation and subsequent restart, returning that particular well to its previous level of efficiency in terms of the concentration of contaminants removed per minute can take hours or days. With the process and apparatus of the present invention, two-phase flow through the vacuum extraction pipe is less likely to be interrupted, and if it is interrupted, restoring of the two-phase flow can be done rapidly; thus, restoration of the well to its previous level of contaminant removal efficiency is also relatively rapid.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams, wherein the flow of gas into the vacuum extraction pipe from the gas inlet is terminated after two-phase flow has been established within the vacuum extraction pipe.

2. A process according to claim 1 wherein the perforations in the riser pipe are situated only below the water table.

3. A process according to claim 1 wherein the perforations in the riser pipe are situated both in the vadose zone and below the water table.

4. A process according to claim 1 wherein gas is introduced into the vacuum extraction pipe through the gas inlet at atmospheric pressure.

5. A process according to claim 1 wherein gas is introduced into the vacuum extraction pipe through the gas inlet at a pressure greater than atmospheric pressure.

6. A process according to claim 1 wherein the common stream moves through the vacuum extraction pipe at a velocity of from about 1 foot per second to about 200 feet per second.

7. A process according to claim 1 wherein the pressure of the gas introduced into the vacuum extraction pipe through the gas inlet is from about atmospheric pressure to about 100 pounds per square inch.

8. A process according to claim 1 wherein the pressure of the gas introduced into the vacuum extraction pipe through the gas inlet is from about 20 to about 60 pounds per square inch.

9. A process according to claim 1 wherein a plurality of gas inlets are provided for the vacuum extraction pipe, wherein the supply of gas to each gas inlet is separately controlled.

10. A process according to claim 8 wherein at least three gas inlets are situated within the vacuum extraction tube.

11. A process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams wherein the vacuum extraction pipe bottom opening terminates at an angle of from about 10° to about 80° with respect to the horizontal.

12. A process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams, wherein a plurality of gas inlets are provided for the vacuum extraction pipe, wherein the supply of gas to each gas inlet is separately controlled, wherein gas is first introduced through a first gas inlet situated uppermost within the vacuum extraction tube, followed by introduction of gas through a second gas inlet situated below the first gas inlet.

13. A process according to claim 12 wherein the process comprises, in the stated order, the steps of (a) introducing gas through the first gas inlet; (b) while gas is being introduced through the first gas inlet, introducing gas through the second gas inlet; and (c) while gas is being introduced through the second gas inlet, terminating the flow of gas through the first gas inlet.

14. A process according to claim 12 wherein the process comprises, in the stated order, the steps of (a) introducing gas through the first gas inlet; (b) terminating the flow of gas through the first gas inlet; and (c) introducing gas through the second gas inlet.

15. A process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams, wherein a plurality of gas inlets are provided for the vacuum extraction pipe, wherein the supply of gas to each gas inlet is separately controlled, wherein gas is simultaneously introduced into the vacuum extraction tube through a first gas inlet situated uppermost within the vacuum extraction tube and a second gas inlet situated below the first gas inlet.

16. A process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams, wherein at least two gas inlet openings are provided in the vacuum extraction pipe, wherein the supply of gas to each gas inlet opening is controlled through a common gas inlet tube, wherein the diameter of the first gas inlet opening situated uppermost in the vacuum extraction pipe is less than the diameter of all gas inlet openings situated beneath said first gas inlet opening, and wherein the diameter of each additional gas inlet opening other than the first gas inlet opening is greater than the diameter of all gas inlet openings situated above said additional gas inlet opening.

17. An apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe for introducing a gas into the vacuum extraction pipe to initiate two-phase flow within the vacuum extraction pipe, a riser pipe gas inlet for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a two-phase common stream, and a means for receiving the common stream and separating the stream into separate gas and liquid streams, wherein the vacuum extraction pipe bottom opening terminates at an angle of from about 10° to about 80° with respect to the horizontal.

18. An apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe for introducing a gas into the vacuum extraction pipe to initiate two-phase flow within the vacuum extraction pipe, a riser pipe gas inlet for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a two-phase common stream, and a means for receiving the common stream and separating the stream into separate gas and liquid streams, wherein at least two gas inlet openings are provided in the vacuum extraction pipe, wherein the supply of gas to each gas inlet opening is controlled through a common gas inlet tube, wherein the diameter of the first gas inlet opening situated uppermost in the vacuum extraction pipe is less than the diameter of all gas inlet openings situated beneath said first gas inlet opening, and wherein the diameter of each additional gas inlet opening other than the first gas inlet opening is greater than the diameter of all gas inlet openings situated above said additional gas inlet opening.

* * * * *